2,852,314

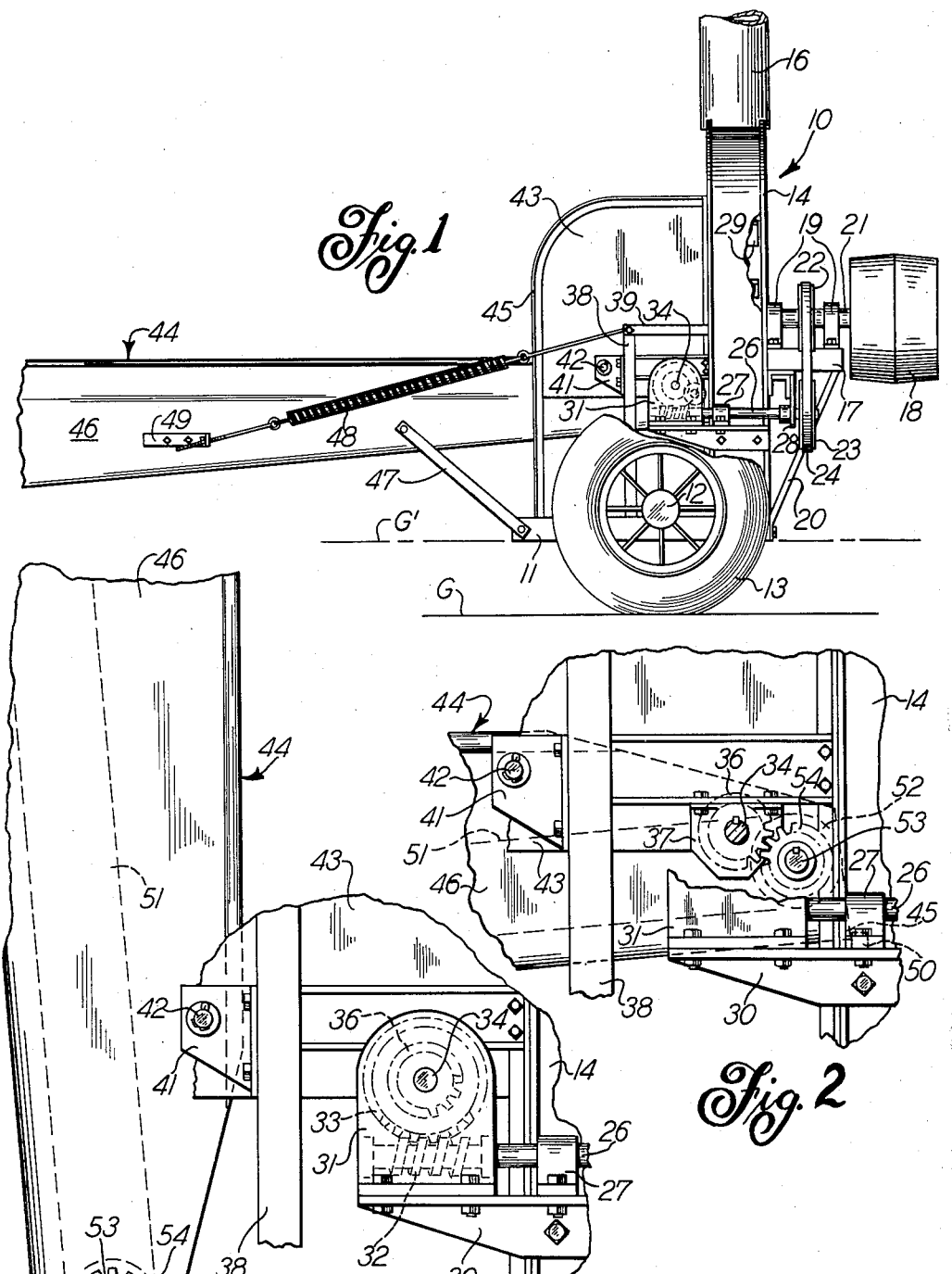

Patented Sept. 16, 1958

2,852,314

FORAGE BLOWER HAVING A SWINGABLE HOPPER

Howard E. Wiltsey, Racine, Wis., assignor to J. I. Case Company, Racine, Wis., a corporation of Wisconsin Application April 26, 1956, Serial No. 580,743

6 Claims. (Cl. 302—37)

This invention relates to a forage blower, and, more specifically, it relates to a swingable mounting of the forage hopper to the blower unit.

It is customary to provide forage or silage blowers with feed troughs or hoppers which are pivotally attached to the blower unit. The purpose of this arrangement is to permit the hopper to be pivoted upwardly and allow the wagon or truck to be driven in a forward direction past the machine until the tail end of the bed is in position for depositing the forage directly into the hopper when the latter is again lowered. This common practice avoids the necessity of backing the wagon or truck up to the hopper if the latter is left in the lowered position. Also, when the machine is not in use, the hopper can be pivoted to the raised position and thus be out of the way.

The hopper usually has a conveyor in the bed thereof and the conveyor is generally driven from the power supplied to the blower unit. When the hopper is raised, the conveyor is still driven unless the conveyor drive is interrupted. If the conveyor is not stopped, it is hazardous in that anyone or anything falling into the conveyor would be forced into the blower unit although the operator intends that the feed to the blower unit be interrupted when the hopper is raised. Further, where a two piece hopper is employed with a hinge connection between the two pieces, the conveyor would be undesirably bent at the hinge point and also forage would not be properly conveyed where the two pieces were in the angled position.

It is an object of this invention to provide a forage blower with a swingable hopper having a forage feed conveyor which becomes inoperative when said hopper is swung to one position of swinging movement. The accomplishment of this object renders the machine safe in its use, among other advantages.

Another object of this invention is to provide a forage blower with a swingable hopper which feeds forage directly into the blower housing. No supplementary conveyors or aprons are thus required to direct the forage into the blower housing.

Other objects and advantages will become apparent upon reading the following description in conjunction with the accompanying drawings, wherein:

Fig. 1 is a side elevational view of a portion of a forage blower.

Fig. 2 is an enlarged side elevational view of a portion of Fig. 1 and with the gear box broken away.

Fig. 3 is an enlarged side elevational view of a portion of Fig. 1 but with the hopper pivoted to the raised position.

The same reference numerals refer to the same parts throughout the several views.

Fig. 1 shows a machine for filling a silo and it is termed a forage blower generally designated 10, which consists of a frame 11 to which is attached a usual axle 12 with a wheel 13 on each end of the axle. It should be understood that the wheels 13 ride on the ground "G" but when the machine is used for blowing, it is preferred to anchor it to the ground by removing the wheels 13 or placing them into a hole so the ground line is then "G'."

A fan housing 14 is suitably supported on the frame 11 with the usual forage exhaust stack 16 connected to the housing. The rear of the housing 14 has a support bracket 17 secured thereto while a brace 20 is attached between the frame 11 and the bracket 17 to stabilize the latter. A driven drum pulley 18 is rotatably mounted in bearing brackets 19 on the member 17 through the pulley shaft 21. Also, a pulley 22 is mounted on the shaft 21 to drive a pulley 23 through a belt 24. The pulley 23 is mounted on a shaft 26 supported in the bearing pieces 27 and 28, as shown, and thus the rotation imparted to the drum 18 is transferred to the shaft 26 in a conventional arrangement of a power transmission unit or driving means. It should be understood that a fan 29 is rotatably disposed within the housing 14 and is driven by the shaft 21 which is on the axis of the fan. The foregoing is typical of a conventional machine, such as that shown in U. S. Patent No. 2,678,239.

An angle iron 30 is shown attached to the side of the housing 14 for supporting the bearing bracket 27. Also, a gear box 31 is shown bolted to the angle 30 and a usual worm gear 32 and worm wheel 33 are disposed within the box 31 and the gear 32 is on the front end of the shaft 26. The worm wheel 33 is mounted on a shaft 34 which leads out of the box 31 toward a spur gear 36 keyed to the shaft 34. A plate 37 is suspended from the housing 14 to support the shaft 34 as shown in Fig. 2. In tracing the drive from the drum 18, it should now be seen that the gear 36 is powered off the drum 18 through the worm and the shafts and the pulleys described.

Two frame pieces 38 and 39 are respectively attached to the frame 11 and the housing 14 with the piece 38 having a plate or bracket 41 bolted thereto. The plate 41 receives a pin or trunnion 42 which projects through a side sheet 43 attached to the front of the housing 14 along with a curved angle iron 45. Of course, the opposite side of the machine is constructed similar to the side shown and as described in this paragraph. A crop or forage receiving hopper 44 is mounted at its intermediate section on the trunnions 42 by having the opposite sides, such as the shown side 46, of the trough-like hopper receive the trunnions 42. This arrangement is such that the hopper 44 is pivotally, swingably, and shiftably mounted on the housing or blower unit of the machine, and the hopper can be pivoted from the one limit of pivot shown in Fig. 1 to the raised position shown in Fig. 3. The Fig. 1 position is, of course, the operating position since forage would be placed into the hopper when the latter is in that position. Also, the Fig. 1 position of the hopper permits the latter to be utilized as a drawbar by having the unshown front end attach to a towing vehicle. Conversely, the Fig. 3 hopper position is the position which permits the hauling vehicle to pass the machine immediately adjacent the blower unit rather than require the vehicle to be backed up to the hopper in the Fig. 1 position. The drawings show the end 45 of the hopper is disposed slightly within the housing 14 in the Fig. 1 position. A stop 50 on the blower unit can be employed to abut the end 45 of the hopper and limit the pivot thereof to insure proper mesh between the gears 36 and 54.

When the hopper is in the Fig. 1 position, a brace 47 can be employed to stabilize the hopper with the blower unit. The brace is removable and, of course, it must be removed or detached when the hopper is raised, and when it is attached, it insures proper positioning of the gear 54 so that the latter meshes with the gear 36. A usual counterbalance spring 48 is anchored between a bracket 49 on the hopper and the pieces 38 and 39 on the blower unit. Again it is preferred that a spring 48 be employed on each side of the hopper to support some of the weight thereof and thus lessen the work required to raise the hopper.

An important feature of this machine is in connection with a chain rake or conveyor 51 disposed in the hopper 44 for the usual purpose of moving forage along the hopper and into the housing 14. The upper flight of the conveyor is actually on a flooring in the hopper and it is, therefore, the upper flight which moves toward the blower housing to take the forage into it. The conveyor 51 has a conventional sprocket 52 (shown dotted) mounted on a shaft 53 and mounted inside the hopper. The opposite unshown end of the conveyor 51 is, of course, provided with another sprocket in the usual manner. The shaft 53 and the sprocket 52 are located at one end of the hopper such that the conveyor extends a substantial distance into the blower unit and essentially into the housing 14 in the Fig. 1 position. Also, a spur gear 54 is mounted on the shaft 53, and the gear 54 is preferably on the outside of the hopper. The gear 54 is in the same plane and, therefore, meshes with the spur gear 36 on the blower unit when the hopper is in the position shown in Figs. 1 and 2. Of course, in this position, the hopper conveyor 51 is driven by the power transmission described, and the forage in the hopper is thus fed into the blower housing. The gear 36 is termed a power transmitting element and the gear 54 is termed a power receiving element. The location of the trunnions 42 and the gears 36 and 54 in the Fig. 2 position is such that the center of the gear 54 is below a line between the center of the trunnion and the center of the gear 36 and this permits movement of the gears into and out of meshing relation in the direction described. The speed of rotation of the gear 36 is normally sufficiently slow to permit the hopper to be pivoted without stopping the drive to the gear 36 to avoid damage to the gears when they move into and out of mesh.

Another factor is the location of the trunnion 42 is the clearance of the hopper with respect to the blower unit when the hopper is in the raised position. Thus, the trunnion is located away from the end of the hopper and at the top thereof.

While a specific embodiment of this invention has been shown and described, it should be obvious that changes could be made therein and the scope of this invention should, therefore, be limited only by the scope of the appended claims.

I claim:

1. In a blower type conveyor for use as a silo filler, of the type including a fan housing, a fan within said housing and driving means for said fan, a feeding device including the combination with said fan housing of a crop receiving hopper shiftably mounted on said housing to be selectively shifted to either an operative position or an inoperative position, crop conveying mechanism including a shaft mounted in said hopper, a sprocket on said shaft, a chain rake carried on said sprocket within said hopper, a first spur gearing element journaled on said fan housing in driven relation to said fan driving means, a second spur gearing element journaled on said hopper in driving relation to said shaft and said feeding device and being so placed on said hopper to be in driven relation to said first spur gearing element when said hopper is in said operative position, and said second spur gearing element being so placed on said hopper as to be moved out of driven relation with respect to said first spur gearing element by reason of shifting of said hopper into said inoperative position, and a stop on said fan housing for abutting said hopper when the latter is in said operative position and thereby positioning said second spur gearing element in said driven relation.

2. In a blower type conveyor for use as a silo filler, the combination of a fan housing, a crop receiving hopper pivotally mounted directly on said housing at an intermediate portion of said hopper and including an end projected toward said fan housing for conveying crops directly thereinto, crop conveying mechanism including a shaft mounted on said end of said hopper adjacent said housing and parallel to the axis of pivot of said hopper, a sprocket on said shaft, a chain rake carried on said sprocket and disposed within the hopper, a chain rake driving element journaled on said fan housing, a chain rake driven element journaled on said hopper in driving relation to said shaft, said driving element and said driven element being disposed to be meshing in driven relation at one limit of pivot of said hopper and said elements being so disposed as to be moved out of mesh when said hopper is pivoted away from said one limit of pivot.

3. In a forage blower of the type including a blower housing and a power transmission mechanism, the combination of a forage receiving hopper vertically pivotally mounted to said forage blower about an axis spaced from an inner end of said hopper and transverse thereto and juxtaposed to said housing to present a hopper overhanging end on the side of said pivot axis opposite from said inner end, a forage conveyor disposed in said hopper for movement therein to convey forage into said blower housing, a power transmitting element on said forage blower in driving relation to said transmission mechanism, a power receiving element on said inner end of said hopper and spaced from said pivot axis of said hopper to be in driven relation with said power transmitting element in one lowered pivotal position of said hopper on said forage blower and said power receiving element being in driving relation to said conveyor, and means on said housing for engagement with said hopper for vertically supporting said overhanging end of said hopper in said one lowered pivotal position of said hopper.

4. In a forage blower of the type including a frame and a blower housing and a power transmission mechanism, the combination of a forage receiving hopper pivotally mounted on said frame about a pivot axis on said hopper spaced from one end thereof such that said hopper extends into said housing when said hopper is in one limit of pivot, a forage conveyor disposed in said hopper for movement therein, a driving spur gear supported on said frame with the axis thereof parallel to and spaced from said pivot axis and in driven relation to said transmission mechanism, a driven spur gear on said end of said hopper in driving relation with said conveyor and with the axis thereof parallel to and spaced from said pivot axis of said hopper to be in driven relation with said driving spur gear when said hopper is in said one limit of pivot and to be out of driven relation with said power transmitting element when said hopper is pivoted away from said one limit of pivot.

5. In a silo filler blower type conveyor of the type including a frame and a fan housing and a power transmission, the combination of a crop receiving hopper vertically pivotally mounted on said frame about a pivot axis thereof and including an end extending into said housing, crop conveying mechanism including a shaft mounted on said end and in said hopper, a sprocket on said shaft, a chain rake carried on said sprocket within said hopper, a first spur gear journaled on said frame in driven relation with said transmission, a second spur gear journaled on said shaft for meshing in driven relation with said first spur gear, said shaft being disposed below a line between said pivot axis and the axis of said first spur gear and said second spur gear thereby being disposed to be movable below said line into and out of meshing relation by reason of vertically pivoting of said hopper with respect to said frame.

6. In a forage blower of the type including a blower housing element and a power transmission mechanism, the combination of a forage receiving hopper associated with the blower housing and having a pivotal hinged connection thereto for upward swinging of said hopper into an inoperative position, a forage conveyor in the hopper for movement therein to convey forage from said hopper into said blower housing, a spur gear on said blower housing element on an axis generally parallel to said hinged connection in driven relation to said power transmission, and a spur gear journaled on said hopper on an axis substantially parallel to that of the first mentioned spur gear at a location spaced from said pivotal hinged connection so as to be displaced bodily by reason of swinging of said hopper about said hinged connection, said spur gears being so positioned as to mesh with each other when said hopper is down in operative position, and to be disengaged when said hopper is swung up into inoperative position, and a connection from the second mentioned spur gear to said conveyor for actuating the same in response to driving of said second mentioned spur gear.

References Cited in the file of this patent

UNITED STATES PATENTS

| | | |
|---|---|---|
| 1,237,212 | Loewen | Aug. 14, 1917 |
| 2,630,351 | Hansen | Mar. 3, 1953 |
| 2,678,239 | Heth | May 11, 1954 |
| 2,698,770 | Van Sickle | Jan. 4, 1955 |